June 14, 1932.  E. BAGNALL  1,863,094

LEAF SPRING

Filed Nov. 4, 1925

Inventor

Edwin Bagnall,

By

Attorneys

Patented June 14, 1932

1,863,094

UNITED STATES PATENT OFFICE

EDWIN BAGNALL, OF TORONTO, ONTARIO, CANADA, ASSIGNOR, BY MESNE ASSIGNMENTS, TO COOPER SPRING SERVICE COMPANY, OF DETROIT, MICHIGAN, A CORPORATION OF MICHIGAN

LEAF SPRING

Application filed November 4, 1925. Serial No. 66,857.

This invention relates to leaf springs such as are commonly used in vehicle constructions, and has for its object to provide in a simple manner for a modified action in such springs, improving their riding qualities in a manner rendering them especially suitable for motor vehicles by providing means in the construction of the springs adapted to reduce bounding or oscillation thereof after a load has been applied to and removed therefrom, and thus minimize the objectionable rocking which is so often prevalent in motor vehicles equipped with leaf springs.

The invention further aims to provide in a spring construction means for regulating the pressure of leaves of the spring one against the other and incidentally the regulating of frictional contact between such leaves, and also to provide contact means at a point somewhat removed from the shackle or usual spring mounting tending to interfere with or modify the ordinary flexion of the spring and thereby still further reduce the tendency of such a spring to oscillate.

Still further objects subsidiary to or resulting from the aforesaid objects, or from the construction or operation of the invention as it may be carried into effect, will become apparent as the said invention is hereinafter further disclosed.

In carrying the said invention into effect I may extend the ends of one of the leaves of a leaf spring beyond its usual limits and provide adjustable abutments or set screws in such ends arranged to contact with another leaf of the spring at points somewhat remote from the shackle ends of such spring, and in a manner resulting in increased pressure being established between a plurality of leaves of the said spring, the degree of pressure being regulated by the adjustment of the set screw, where the abutment is in the form of a set screw, and the arrangement admitting of many modifications.

The invention is more particularly described and ascertained hereinafter, by way of example, having reference to the accompanying drawing, wherein—

Similar characters of reference indicate similar parts in the several figures of the drawing.

Figure 1:
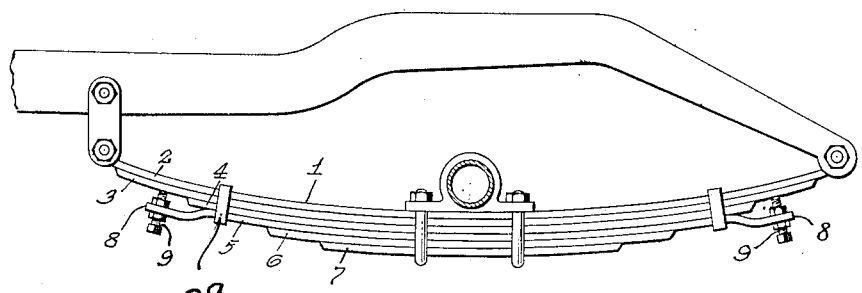
Figure 1 is an elevation of a leaf spring embodying the said invention.

Referring to Figure 1, 1 is a leaf spring having leaves 2, 3, 4, 5, 6 and 7 varying in length in the usual manner, this type of spring being very commonly used in vehicle construction but having the objection that it is subject to violent oscillation or bouncing when a load is suddenly relieved therefrom.

It will be seen, however, that in the improved leaf spring illustrated in the said Figure 1 provision is made to overcome this tendency and consists in extending the ends of the leaf 5 somewhat further than usual, to form arms 8 projecting somewhat over the end portions of the leaf 3, these arms being provided with abutments in the form of set screws 9 adapted to engage the said end portions of the leaf 3.

It will be obvious that, by adjustment of the said set screw, pressure of the said leaf 3 upon the leaf 2 may be considerably increased with consequent increase of friction between the leaves 2 and 3 when the spring is flexed. This has a decided damping effect on the spring which is especially noticeable in its modifying of the rebound thereof, so that the normal tendency of the spring to oscillate upon the relief of a load therefrom is greatly diminished and the spring comes to rest without such excessive oscillation taking place, thereby greatly improving the riding qualities of the spring.

The pressure between the leaves may be varied by the adjustment of the set screws to meet the peculiar conditions to which the spring is subjected or of the spring itself, so that in adapting the spring to a vehicle it may be readily set to meet the conditions imposed thereon by the vehicle or the use to which the vehicle is to be put. In the described arrangement of parts the straps 9a enter into the securing of the required operation of the abutments by preventing separation of the leaves by the pressure of the abutments, the said straps embracing the leaves of the spring including the extended leaf 5.

Similar results may be secured in slightly different ways. For instance, in Figure 2 I show a leaf spring 10 having leaves 11, 12, 13, 14, 15 and 16, the end portion of the leaf 12 being reversely bent to form an arm 17 extending over the end portion of the leaf 13, this arm being also provided with an abutment in the form of a set screw 18 bearing upon the said end portion of the leaf 13 and determining the friction between the said leaves 12 and 13 in the manner of the previously described arrangement; and in Figure 3 a leaf spring 19 is shown having leaves 20, 21, 22, 23, 24 and 25, the end of the leaf 22 being extended beyond and around the shackle end of the end of the leaf spring to form an arm 26 extending over the end portion of the leaf 20, this arm being provided with an abutment in the form of a set screw 27 which controls the friction between the leaves 20, 21 and 22.

Figure 2:
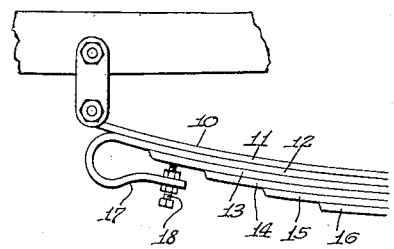
Figure 2 is a fragmentary view of such a spring illustrating a modified form of the same.
Figure 3:
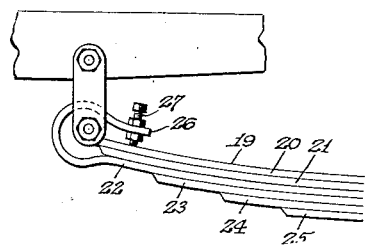
Figures 3, 4 and 5 are similar views of further modifications.
Figure 4:
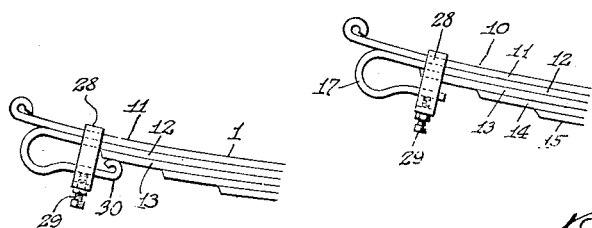
Figure 5:
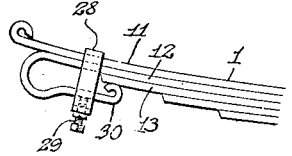

Figure 4 shows a spring similar to that illustrated in Figure 2 except that the set screw 18 in the arm 17 is omitted, and a strap 28 substituted therefor forming an abutment which encircles the leaf 11 and the arm 17 and is provided with a set screw 29 by means of which the said arm 17 may be flexed in opposition to its resistance towards the said leaf 11 and thereby regulate the pressure between the leaves 11 and 12; and in Figure 5 a similar arrangement is shown, but the arm 17 is provided with an abutment 30 which bears upon the end of the said leaf 13, and the strap 28 and set screw 29 in this case regulate the pressure between the leaves 11, 12 and 13 of the leaf spring.

The effect of these constructions is also to vary somewhat the flexion of such springs from the normal so that there is a tendency to counter flex about the points of contact with the said abutments, which still further minimizes any tendency of the springs to oscillate objectionably, and the said improvements may be readily embodied in spring constructions without much added expense, and greatly improve the riding qualities of such springs when they are applied to vehicles.

This invention may be developed within the scope of the following claims without departing from the essential features of the said invention, and it is desired that the specification and drawing be read as merely illustrative and not in a limiting sense, except as necessitated by the prior art.

What I claim is:—

1. As a new article of manufacture, a laminated leaf spring wherein the ends of one of the leaves of the said spring are extended over the end portions of another of the leaves of the spring and provided with abutments adapted to engage the said end portions over which they extend to increase the initial frictional contact of the end portions of the leaf so engaged with the underlying leaf of the spring, and straps embracing the leaves of said spring including the extended leaf to prevent separation of said leaves.

2. A laminated leaf spring according to claim 1, wherein means are provided for increasing the pressure of the abutments against the part of the spring which they engage by tending to flex said extended leaf about said straps.

3. A laminated spring wherein the ends of one of the leaves are extended beyond their usual limits to form arms, said arms being inversely bent to extend toward the central portion of the spring, abutments on the arms engaging another of the leaves of the spring to increase the pressure between a plurality of leaves of the said spring, straps embracing the leaves of said spring and including said extended leaf proximate to the extensions thereof, and means for regulating the pressure of said abutment on said spring.

4. In a spring structure of the character set forth, a plurality of superposed leaf members, a spring tongue arranged in spaced relation to one of the members and connected at one end thereto, and engaging elements carried by the other end of the spring tongue and one of the other of said members.

5. In a spring structure of the character set forth, a plurality of superposed leaf members, a spring tongue arranged in spaced relation to one of the members and connected at one end thereto, and members having slidable engagement with each other and connected to the other end of the spring tongue and to one of said other members.

6. A vehicle-spring control device for multiple leaf springs including a leaf of said spring, one end of which leaf is extended to form a lever arm spaced from the ends of the adjacent leaves, said lever arm being fulcrumed intermediate its free end and the place of contact of the leaf of which it is a part, with the body of the spring.

7. A leaf spring including a leaf having a shock absorbing element integral with the same and having the end thereof abutting said spring and free to move longitudinally of the same.

In testimony whereof I affix my signature.

EDWIN BAGNALL.